US012717253B2

(12) United States Patent
Itoyama et al.

(10) Patent No.: US 12,717,253 B2
(45) Date of Patent: Aug. 25, 2026

(54) IMAGE FORMING DEVICE THAT DETERMINES WHEN TO FILL TONER FOR FORMING IMAGES

(71) Applicant: SHARP KABUSHIKI KAISHA, Sakai City (JP)

(72) Inventors: Motoyuki Itoyama, Sakai City (JP); Masayasu Narimatsu, Sakai City (JP); Shohei Fukumoto, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 18/980,047

(22) Filed: Dec. 13, 2024

(65) Prior Publication Data

US 2025/0199438 A1 Jun. 19, 2025

(30) Foreign Application Priority Data

Dec. 19, 2023 (JP) ................................ 2023-214077

(51) Int. Cl.
*G03G 15/08* (2006.01)
*G03G 15/00* (2006.01)
*G03G 15/01* (2006.01)

(52) U.S. Cl.
CPC ..... *G03G 15/0856* (2013.01); *G03G 15/0121* (2013.01); *G03G 15/0189* (2013.01); *G03G 15/0822* (2013.01); *G03G 15/0858* (2013.01); *G03G 15/086* (2013.01); *G03G 15/0862* (2013.01); *G03G 15/0863* (2013.01); *G03G 15/0865* (2013.01); *G03G 15/0875* (2013.01); *G03G 15/0877* (2013.01); *G03G 15/0879* (2013.01); *G03G 15/0891* (2013.01); *G03G 15/5016* (2013.01)

(58) Field of Classification Search
CPC ........... G03G 15/0856; G03G 15/0875; G03G 15/5016; G03G 15/0121; G03G 15/0189; G03G 15/0891; G03G 15/0822; G03G 15/0858; G03G 15/086; G03G 15/0862; G03G 15/0863; G03G 15/0865; G03G 15/0877; G03G 15/0879
See application file for complete search history.

(56) References Cited

U.S. PATENT DOCUMENTS

2022/0113653 A1* 4/2022 Arai .................. G03G 15/0872

FOREIGN PATENT DOCUMENTS

JP 2018-004792 A 1/2018

* cited by examiner

*Primary Examiner* — Joseph S Wong
(74) *Attorney, Agent, or Firm* — ScienBiziP, P.C.

(57) ABSTRACT

An image forming device forms an image using toner contained in an attached cartridge, and includes: a development unit that forms a toner image on a photoreceptor drum; a conveyor that receives the toner from the cartridge and conveys the toner to the development unit; a toner sensor that detects the amount of toner stored in the development unit; an attachment/detachment detector that detects attachment and detachment of the cartridge; and a controller including a storage, the controller determining whether to perform a filling operation to fill the conveyor with the toner based on a filling determination variable stored in the storage when attachment of the cartridge is detected.

8 Claims, 9 Drawing Sheets

IMAGE FORMING DEVICE THAT DETERMINES WHEN TO FILL TONER FOR FORMING IMAGES

TECHNICAL FIELD

The disclosure relates to an image forming device that forms an image using toner contained in an attached cartridge.

BACKGROUND ART

In the related art, an electrophotographic image forming device is known. In such an image forming device, an image is formed (printed) using toner (developer) contained in a cartridge. The toner is consumed during image formation, and the toner stored in the cartridge is finally exhausted. The empty cartridge is removed from the image forming device, and a new cartridge is mounted.

In an image forming device, a development device that forms a toner image is provided with a conveyor to convey toner from a cartridge to the development device. Thus, there has been proposed an image forming device that determines a location where an abnormality occurs in a toner supply path.

SUMMARY

Technical Problem

A known image forming device includes: a developer conveyor that conveys a developer to a developer accommodating portion; a first developer detector that detects the developer conveyed by the developer conveyor; a second developer detector that detects the developer in the developer accommodating portion; and a determiner that determines that the first developer detector is in an abnormal state when a predetermined increase in developer in the developer accommodating portion is determined based on a detection result of the second developer detector when it is determined that a predetermined developer to be conveyed by the developer conveyor is not conveyed based on a detection result of the first developer detector.

The known image forming device is provided with the first developer detector in order to check whether the developer is conveyed by the developer conveyor, and involves an issue that it cannot be determined whether the developer exists in a conveying path when the first developer detector is not provided for the developer conveyor.

The disclosure has been made to address the above issue, and an object is to provide an image forming device capable of determining the necessity of an operation to fill a developer conveyor with toner, even without providing a sensor that detects the presence or absence of toner for the developer conveyor.

Solution to Problem

The disclosure provides an image forming device that forms an image using toner contained in an attached cartridge, the image forming device including: a development unit that forms a toner image on an image carrier; a conveyor that receives the toner from the cartridge and conveys the toner to the development unit; a toner sensor that detects an amount of the toner stored in the development unit; an attachment/detachment detector that detects attachment and detachment of the cartridge; and a controller including a storage, the controller determining whether to perform a filling operation to fill the conveyor with the toner based on a filling determination variable stored in the storage when the attachment/detachment detector detects attachment of the cartridge.

In the image forming device according to the disclosure, the filling determination variable may be set to an initial value or a value different from the initial value; and when the attachment/detachment detector detects the attachment of the cartridge, the controller may perform the filling operation when a value of the filling determination variable stored in the storage is the initial value, and may not perform the filling operation when the value of the filling determination variable is a value other than the initial value.

In the image forming device according to the disclosure, when the toner sensor detects an increase in the toner amount when the filling operation is performed, the controller may cause the conveyor to stop conveying the toner, change the value of the filling determination variable to a value different from the initial value, and store the changed value in the storage.

The image forming device according to the disclosure may further include a display, and when the toner sensor does not detect an increase in the toner amount even if an operation time of the conveyor exceeds a prescribed time, which is a predetermined time, during execution of the filling operation, the controller may stop the filling operation and display occurrence of an error on the display.

In the image forming device according to the disclosure, the controller may cause the conveyor to convey the toner when the value of the filling determination variable stored in the storage is a value other than the initial value and the toner sensor detects a toner amount less than a predetermined value, and determine that the cartridge is empty of the toner and set the filling determination variable to the initial value when the toner amount detected by the toner sensor does not increase.

In the image forming device according to the disclosure, a plurality of cartridges may be attachable and detachable, and the image forming device includes conveyors and development units corresponding to the respective cartridges; and the plurality of conveyors may be different from each other in length of a conveying path from the cartridge to the development unit.

The image forming device according to the disclosure may further include a display, and when there is a conveyor for which the toner sensor does not detect an increase in the toner amount even when an individual prescribed time, which is a predetermined time, determined in accordance with the length of the conveying path is exceeded during execution of the filling operation, the controller may cause the corresponding conveyor to stop the filling operation and display occurrence of an error on the display.

In the image forming device according to the disclosure, the plurality of cartridges may be disposed so as to be adjacent to each other, and an interval between some of the cartridges is greater than an interval between a plurality of image carriers and an interval between others of the cartridges is less than the interval between the plurality of image carriers.

Advantageous Effects of Disclosure

According to the disclosure, it is possible to determine the necessity of a filling operation by referencing the value of a filling determination variable stored in a storage when a cartridge is attached to a main body, even without providing a sensor that detects the presence or absence of the toner for a conveyor.

DESCRIPTION OF EMBODIMENTS

An image forming device according to an embodiment of the disclosure will be described below with reference to the drawings.

Figure 1:
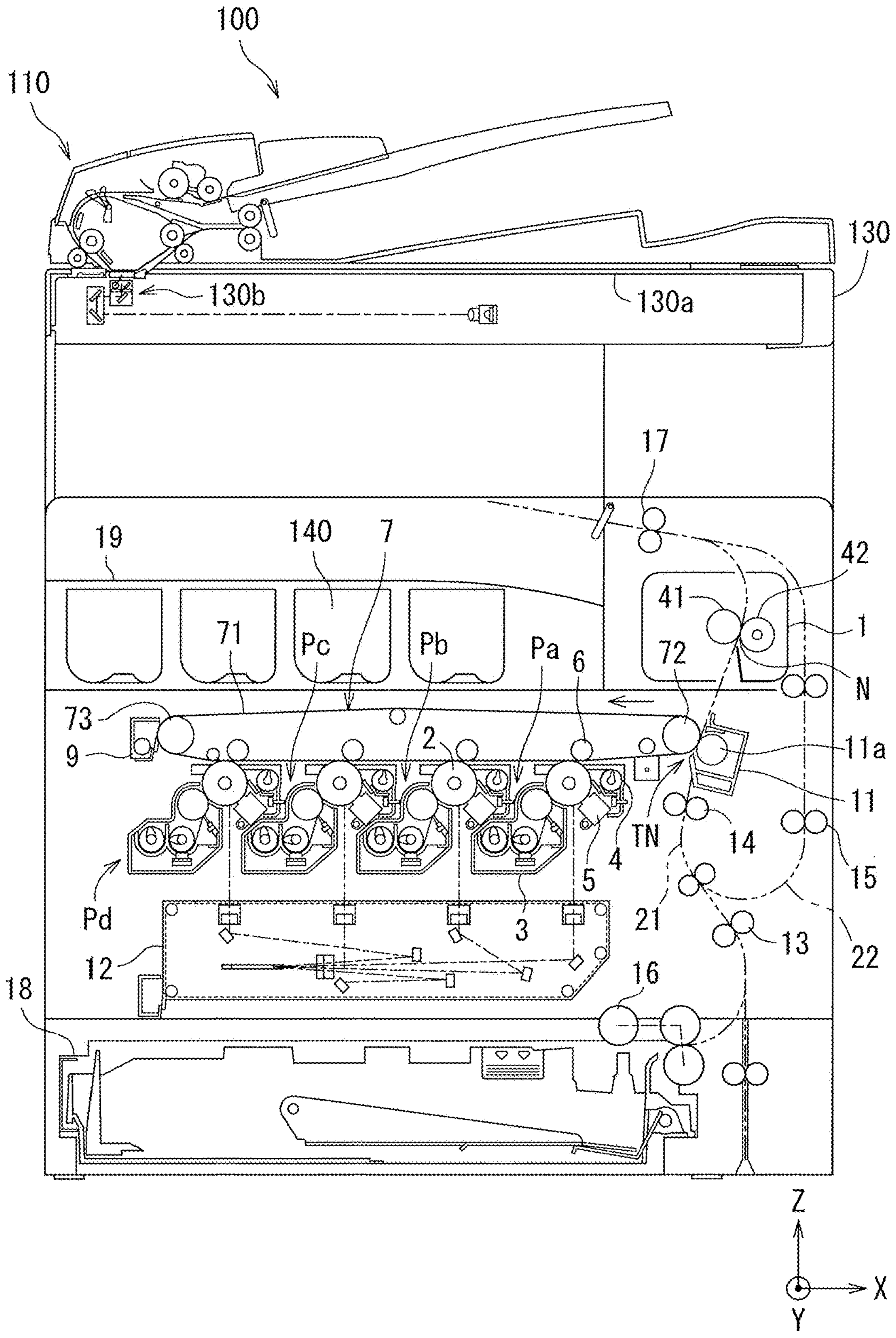
FIG. 1 is a schematic cross-sectional view illustrating the configuration of an image forming device according to an embodiment of the disclosure.

FIG. 1 is a schematic cross-sectional view illustrating the configuration of an image forming device according to an embodiment of the disclosure. An arrow X illustrated in the drawings indicates a right-left direction X when an image forming device 100 is viewed from the front, and the direction indicated by the arrow X is the right side. An arrow Y illustrated in the drawings indicates a depth direction Y of the image forming device 100, and the front side with respect to the paper surface is the front side of the device and the back side with respect to the paper surface is the back side of the device. An arrow Z illustrated in the drawings indicates an up-down direction Z when the image forming device 100 is viewed from the front, and the direction indicated by the arrow Z is the upper side.

The image forming device 100 is a multi-function printer that has a copy function, a scanner function, a facsimile function, and a printer function. The image forming device 100 transmits an image of a document read by an image reader 130 to an external device, or forms an image of a document read by the image reader 130 or an image received from an external device on a recording medium such as a sheet in color or black and white.

A document transport device 110 supported in an openable/closable manner is provided on an upper side of the image reader 130. The document transport device 110 conveys one or a plurality of documents one by one to a document reading position where a scanning optical system **130*b* is stopped. The image reader 130 generates image data by reading a document placed on a document table 130*a* using the scanning optical system 130*b* to scan the document, or by reading a document conveyed by the document transport device 110 using the scanning optical system 130*b*** stopped at the document reading position.

The image forming device 100 includes a fixing device 1, a photoreceptor drum 2 (an example of an image carrier), a development unit 3, a drum cleaning device 4, a charger 5, an intermediate transfer belt device 7, a secondary transfer device 11, an optical scanning device 12, a sheet feeder 18, etc.

The image forming device 100 handles image data corresponding to a color image composed of the colors of black (K), cyan (C), magenta (M), and yellow (Y), or a monochrome image composed of a single color (black, for example). The image forming device 100 is provided with four sets of the development unit 3, four sets of the photoreceptor drum 2, four sets of the drum cleaning device 4, and four sets of the charger 5 that form four types of toner images, with the sets respectively serving as image stations Pa, Pb, Pc, Pd corresponding to the colors of black, cyan, magenta, and yellow, respectively.

The photoreceptor drum 2 is an image carrier on which a toner image having a photosensitive layer formed on a surface thereof is formed. The photosensitive layer has characteristics of exhibiting insulating properties when not irradiated with light, and changing to be conductive in a region irradiated with light. The charger 5 uniformly charges the surface (photosensitive layer) of the photoreceptor drum 2 to a predetermined potential. The optical scanning device 12 forms an electrostatic latent image by exposing the surface of the photoreceptor drum 2 charged to the predetermined potential on the basis of the image data. The development unit 3 forms a toner image on the surface of the photoreceptor drum 2 by developing the electrostatic latent image formed on the front surface of the photoreceptor drum 2 with a toner. The drum cleaning device 4 removes and collects residual toner that remains on the surface of the photoreceptor drum 2 without being intermediately transferred to the intermediate transfer belt device 7 to be described next. The surface of the photoreceptor drum 2 cleaned by the drum cleaning device 4 is destaticized by a destaticizing device (not illustrated), and the electrostatic latent image formed on the surface of the photoreceptor drum 2 is erased. With this series of operations described above, toner images of respective colors are formed on the respective surfaces of the photoreceptor drums 2.

The intermediate transfer belt device 7 includes an intermediate transfer belt 71 having an endless shape, an intermediate transfer driving roller 72, an intermediate transfer driven roller 73, an intermediate transfer roller 6, and a cleaning device 9. The intermediate transfer belt 71 is stretched over the intermediate transfer driving roller 72 and the intermediate transfer driven roller 73. The intermediate transfer roller 6 is provided inside the intermediate transfer belt 71 at a position corresponding to each of the photoreceptor drums 2 on which four types of toner images corresponding to respective colors are formed. The intermediate transfer belt 71 is brought into contact with the photoreceptor drums 2 by the intermediate transfer rollers 6, and the toner images of the respective colors formed on the surfaces of the photoreceptor drums 2 are sequentially intermediately transferred to the intermediate transfer belt 71 which is circularly moved by the rotation of the intermediate transfer driving roller 72.

In the image forming device 100, the toner images of the respective colors formed on the surfaces of the respective photoreceptor drums 2 are sequentially transferred and superimposed to form color toner images on the surface of the intermediate transfer belt 71. The cleaning device 9 removes and collects secondary transfer residual toner that remains on the surface of the intermediate transfer belt 71 without being transferred to the sheet by the secondary transfer device 11 to be described later.

The secondary transfer device 11 includes a secondary transfer roller 11*a* disposed to be in contact with the intermediate transfer belt 71. In the secondary transfer device 11, the sheet P transported through a sheet conveying path 21 is transported while being nipped at a transfer nip portion TN which is a region in which a secondary transfer roller 11*a* and the intermediate transfer belt 71 are in contact with each other. When the sheet passes through the transfer nip portion TN, the toner image on the surface of the intermediate transfer belt 71 is transferred onto the sheet, and the sheet is conveyed to the fixing device 1.

The fixing device 1 includes a fixing belt 41 and a pressure roller 42 (an example of a pressure member) that rotate around an axis. In the fixing device 1, the sheet with the transferred toner image is heated and pressurized while being nipped at a nip portion N which is a region in which the fixing belt 41 and the pressure roller 42 are in contact with each other, and the toner image is fixed onto the sheet. Although not illustrated in FIG. 1, the fixing device 1 may also include components other than the fixing belt 41 and the pressure roller 42.

The sheet feeder 18 includes a sheet feeding cassette that stores recording media (sheets) to be used for image formation, and is provided below the optical scanning device 12. The sheets are pulled out from the sheet feeder 18 by a pickup roller 16 one by one, and conveyed to the sheet conveying path 21. The sheet conveyed to the sheet conveying path 21 is discharged to a discharge tray 19 by discharge rollers 17 by way of the secondary transfer device 11 and the fixing device 1.

Conveying rollers 13, registration rollers 14, and the discharge rollers 17 are disposed along the sheet conveying path 21. The conveying rollers 13 facilitate the conveyance of the sheet. The registration rollers 14 convey the sheet at a speed equal to a process speed at which an image is formed on the sheet. The registration rollers 14 are provided between the sheet feeder 18 and the secondary transfer device 11, and adjust the conveyance timing of the sheet so that the toner image is transferred to the sheet in the secondary transfer device 11. For example, the registration roller 14 stands by (temporarily stops) in a state of nipping the sheet conveyed from the sheet feeder 18, and starts conveying the sheet so that the sheet reaches the transfer nip portion TN at a timing when the toner image formed on the intermediate transfer belt 71 reaches the transfer nip portion TN.

Further, when an image is to be formed on both a front surface and a back surface of the sheet, the sheet is conveyed to a reverse conveying path 22 with the direction of conveying the sheet changed by the discharge rollers 17. The front and back sides of the sheet conveyed to the reverse conveying path 22 are reversed while the sheet is conveyed to the registration rollers 14 by reverse feeding rollers 15. The image forming device 100 forms an image on the back surface of the sheet guided to the registration rollers 14 similar to the case of forming an image on the front surface of the sheet, and discharges the sheet to the discharge tray 19.

The image forming device 100 has a configuration in which a cartridge 140 containing toner is mounted, and toner is supplied from the cartridge 140 to the development unit 3 via a conveyor 80 to be described later. In the present embodiment, four cartridges 140 are mounted corresponding to each color to be used, and each cartridge 140 is detachably attached to the image forming device 100.

Figure 2:
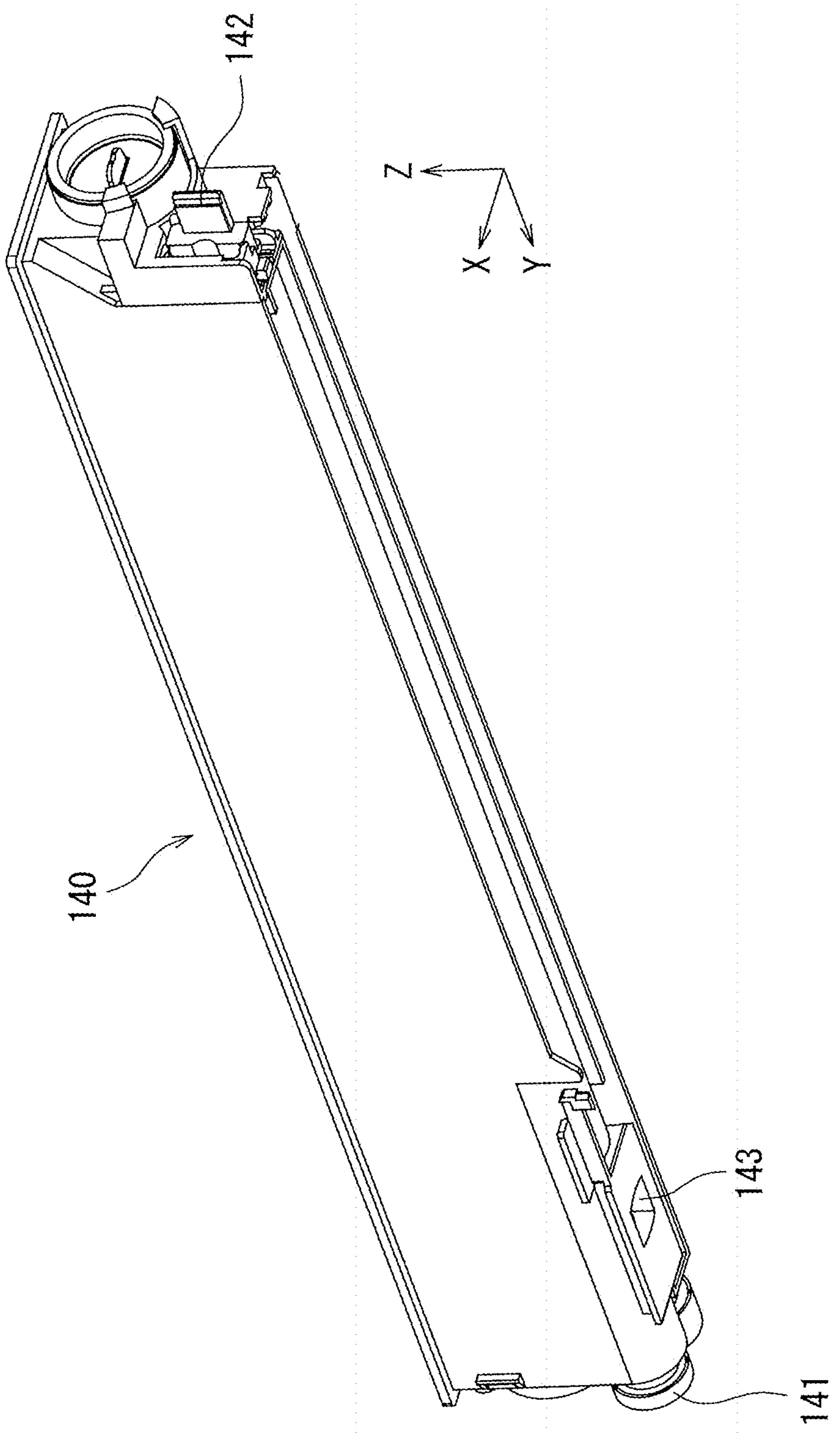
FIG. 2 is a perspective view illustrating a cartridge.
Figure 3:
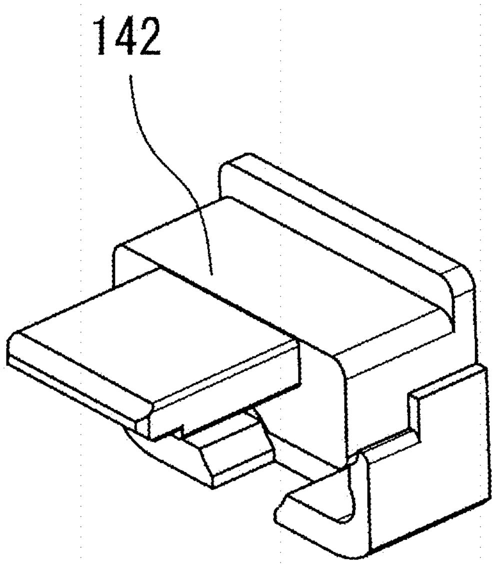
FIG. 3 is a perspective view illustrating a connection terminal attached to the cartridge.

FIG. 2 is a perspective view illustrating a cartridge. FIG. 3 is a perspective view illustrating a connection terminal attached to the cartridge.

The cartridge 140 is a container that stores toner in a space provided therein, and a connection terminal 142 to be connected to the image forming device 100 is provided at an end portion of the cartridge 140. The connection terminal 142 has a memory mounted therein and stores information related to the cartridge 140. The information related to the cartridge 140 is, for example, the color of the stored toner, the size of the cartridge 140, or the like, but is not limited thereto, and may include other information as appropriate.

The cartridge 140 includes, at an end portion opposite to the side where the connection terminal 142 is disposed, a discharge port 143 through which the toner contained therein is discharged, and a cartridge gear 141 that rotates upon receiving a rotational force of a toner supply motor 150 to be described later. Further, the cartridge 140 includes therein a screw 144 that stirs and conveys the stored toner. An end portion of the screw 144 is connected to the cartridge gear 141, and the cartridge gear 141 rotates upon receiving a rotational force of the toner supply motor 150. When the screw 144 is rotated by the rotational force received via the cartridge gear 141, the screw 144 conveys the toner stored therein toward the discharge port 143. The toner conveyed to the discharge port 143 by the screw 144 falls from the discharge port 143 and is conveyed to the conveyor 80 to be described later. A developer containing a toner and a carrier (so-called two-component developer) may be stored in the cartridge 140.

The image forming device 100 is provided with a recessed portion corresponding to the connection terminal 142, and provided with a sensor (an example of an attachment/detachment detector 161) that detects whether the connection terminal 142 is present in the recessed portion. Then, it is possible to detect attachment and detachment of the cartridge 140 based on the detection result of the sensor. That is, the image forming device 100 includes an attachment/detachment detector 161 that detects attachment and detachment of the cartridge 140. The method of detecting attachment and detachment of the cartridge 140 is not limited to this, and the image forming device 100 may be provided with an engagement terminal that communicates with the memory in the connection terminal 142. In this configuration, when the connection terminal 142 is connected to the engagement terminal provided in the image forming device 100, information stored in the memory in the connection terminal 142 can be read out, and attachment and detachment of the cartridge 140 may be detected according to whether communication with the memory in the connection terminal 142 is possible or whether information stored in the memory in the connection terminal 142 can be read out.

Figure 4:
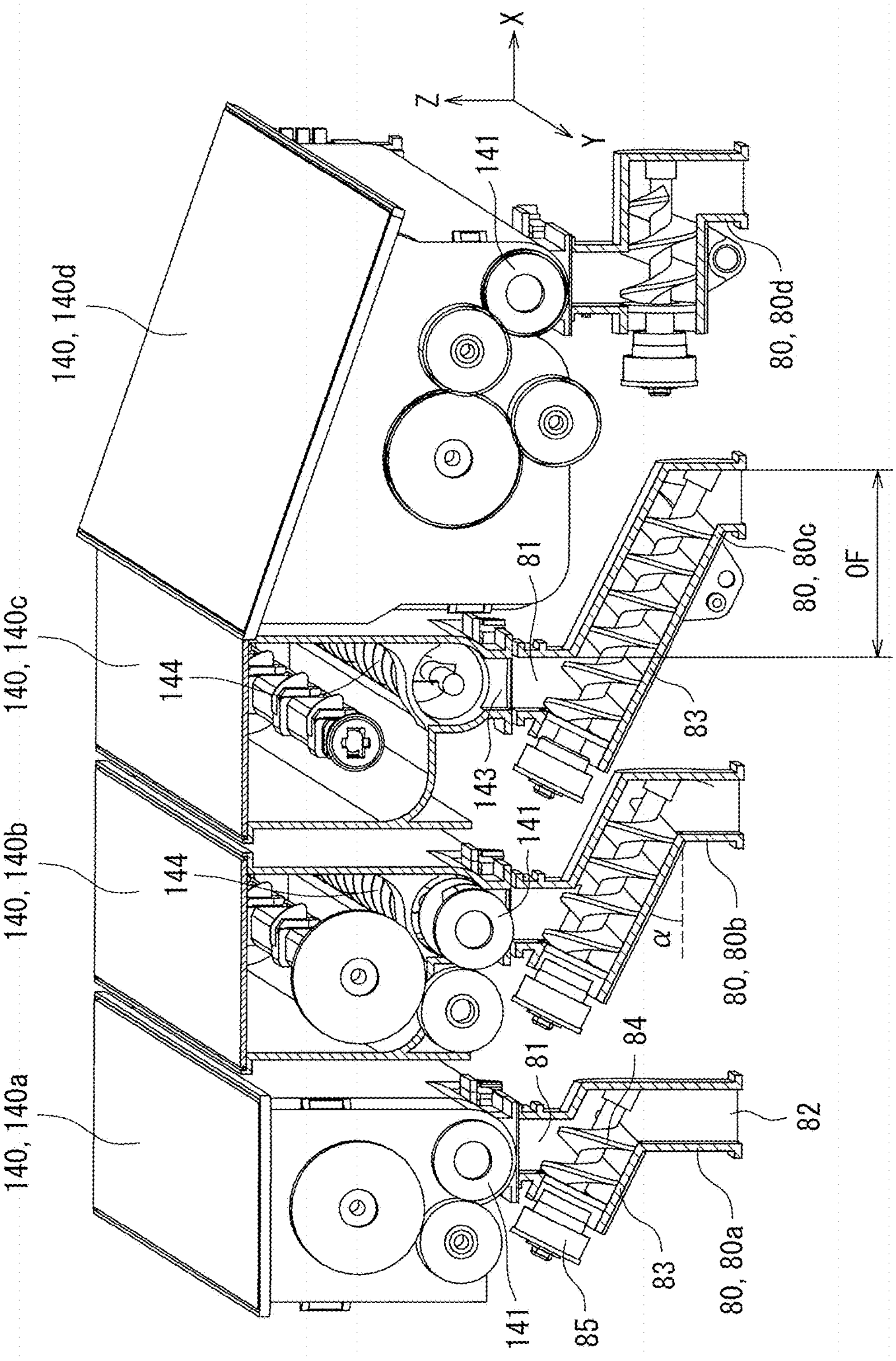
FIG. 4 is a cross-sectional view illustrating a main part of the cartridges and conveyors.

FIG. 4 is a cross-sectional view of a main part illustrating the cartridges and the conveyors.

FIG. 4 illustrates a cross section of a part of the cartridge 140 and the conveyor 80. In the present embodiment, the image forming device 100 includes four cartridges 140 (first cartridge 140*a* to fourth cartridge 140*d*). Among the four cartridges 140, a first cartridge 140*a*, a second cartridge 140*b*, and a third cartridge 140*c* are substantially the same, and a fourth cartridge 140*d* is larger in size than the others. The four cartridges 140 are arranged side by side in one direction (the right-left direction in FIG. 4) so as to be adjacent to each other, and the fourth cartridge 140*d* is wider in the direction in which the cartridges are arranged. The fourth cartridge 140*d* is large in size and preferably corresponds to toner to be used in a large amount. For example, the fourth cartridge 140*d* contains black (K) toner.

As described above, the cartridge 140 is provided with the discharge port 143 through which toner is discharged. The discharge port 143 is provided in the bottom portion of the cartridge 140, and is connected to an introduction port 81 of the conveyor 80 provided below the discharge port 143 in the up-down direction Z. Although not described in detail, the cartridge 140 is provided with a shutter that opens and closes a discharge port. When the cartridge 140 is detached from the image forming device 100, the shutter is closed to block leakage of toner, and when the cartridge 140 is attached to the image forming device 100, the shutter is opened to enable supply of toner.

Four conveyors 80 (first conveyor 80*a* to fourth conveyor 80*d*) are provided corresponding to the four cartridges 140 and the four development units 3. The conveyor 80 includes an introduction port 81 connected to the discharge port 143 of the corresponding cartridge 140, a supply port 82 connected to a reception port 37 (see FIG. 7 to be described later) provided in the corresponding development device 3, a conveying path 83 through which the toner received from the introduction port 81 is conveyed to the supply port 82, and a transport member 84 (transport screw) provided in the conveying path 83.

Here, the supply port 82 is provided not directly below the introduction port 81 in the up-down direction Z but so as to be offset (displaced) in the right-left direction X. An offset distance OF indicated in FIG. 4 represents a distance by which the supply port 82 is displaced in the right-left direction X with respect to the introduction port 81. The conveying paths 83 of the first conveyor 80*a* to the third conveyor 80*c* are arranged to be inclined downward from the horizontal direction from the introduction port 81 toward the supply port 82, for example, at an angle α (25 degrees in the present embodiment), and the conveying path 83 of the fourth conveyor 80*d* is arranged horizontally from the introduction port 81 toward the supply port 82.

A transport gear 85 is attached to an end portion of the transport screw 84, and is rotated by a driving force transmitted via the transport gear 85 to convey the toner that has fallen through the introduction port 81 and has been fed into the conveying path 83 toward an end portion on the supply port 82 side, which is directly above the supply port 82. The toner that has reached the end portion on the supply port 82 side falls therefrom and is fed into the development device 3 from the lower supply port 82. That is, the conveyor 80 receives the toner from the cartridge 140 and conveys the toner to the development unit 3.

The four conveyors 80 are configured such that the lengths of the conveying paths 83 from the cartridges 140 to the development units 3 are different from each other. To be specific, a length DLa of the conveying path 83 of the first conveyor 80*a*, a length DLd of the conveying path 83 of the fourth conveyor 80*d*, a length DLb of the conveying path 83 of the second conveyor 80*b*, and a length Dc of the conveying path 83 of the third conveyor 80*c* are configured to become longer in this order. With such a configuration, the size (toner storage capacity) of the cartridge 140 can be changed as described above in accordance with the use frequency or the like. In the present embodiment, the size (storage capacity) of the cartridge 140*d* containing black toner, which is frequently used, is made larger than those of the other cartridges.

Figure 5:
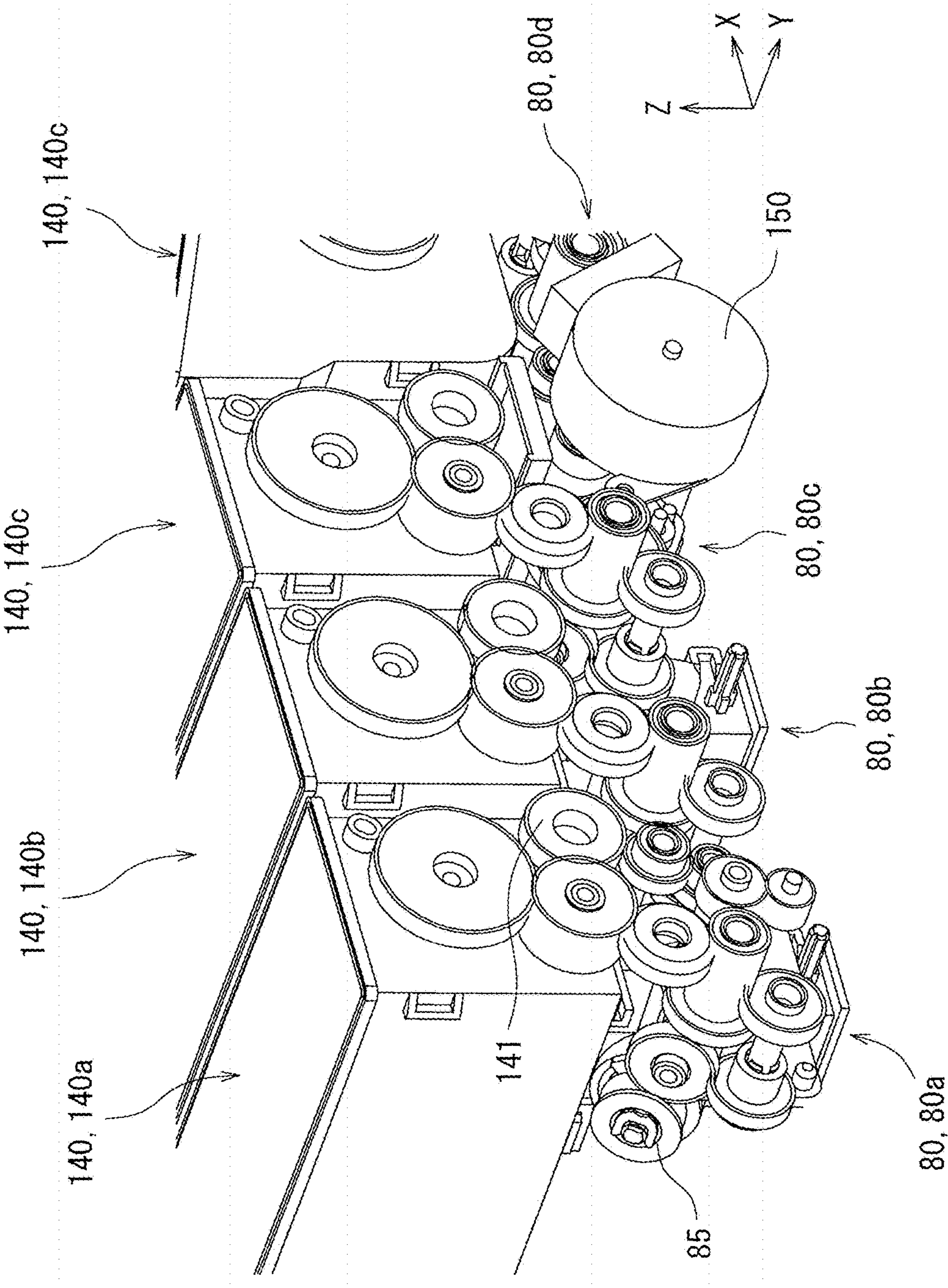
FIG. 5 is a perspective view of a main part illustrating the relationship between the cartridges and the conveyors and a driving source.

FIG. 5 is a perspective view of a main part illustrating a relationship between the cartridges and the conveyors and a driving source.

The image forming device 100 is provided with the toner supply motor 150 that drives the cartridge 140 and the conveyor 80, and a transmission mechanism composed of a plurality of gears and the like. The driving force of the toner supply motor 150 is transmitted to the cartridge gear 141 and the transport gear 85 via the transmission mechanism to rotate the corresponding screw. The transmission mechanism may be provided with a one-way clutch that regulates the rotation direction, a clutch that controls transmission of the driving force, or the like. The toner supply motor 150 and the transmission mechanism are included in a toner supply unit 80.

Figure 6:
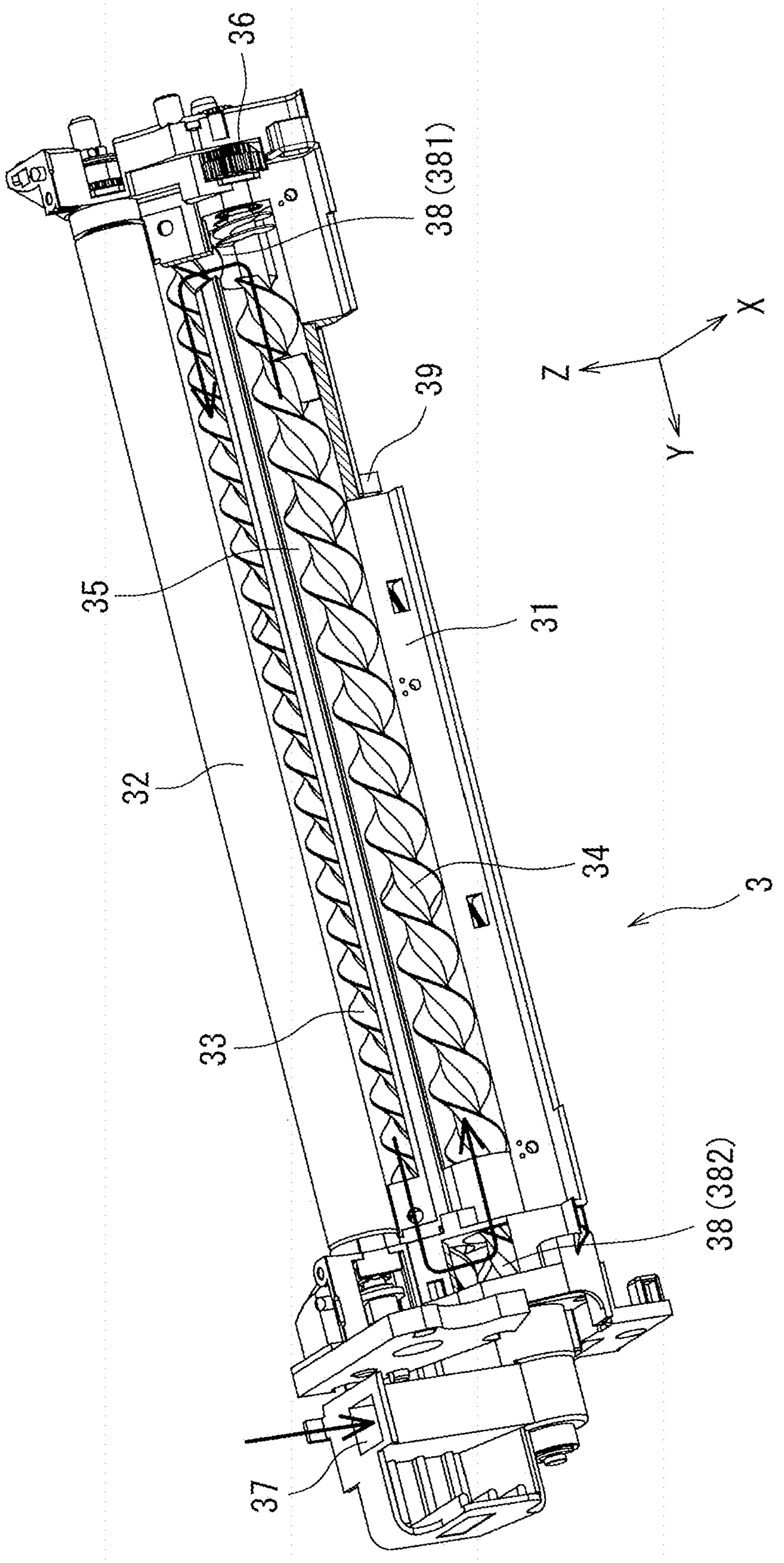
FIG. 6 is a perspective view illustrating the internal structure of a development unit.

FIG. 6 is a perspective view illustrating the internal structure of the development unit. FIG. 6 illustrates a state in which a part of a housing of the development unit 3 has been removed so that the inside of the development unit 3 can be easily seen.

The development unit 3 includes a housing 31, a development roller 32, a first screw 33, and a second screw 34. The housing 31 has therein a space in which the development roller 32, the first screw 33, the second screw 34, and the developer containing the toner are accommodated, and has a substantially rectangular shape. In the present embodiment, a two-component developer containing a non-magnetic toner and a magnetic carrier is used as the developer. The space of the housing 31 is partitioned into two regions by a partition wall 35 extending along the longitudinal direction. The partition wall 35 is provided with openings 38 at portions corresponding to both end portions in the longitudinal direction (depth direction Y). The opening 38 provided at the end portion on the back surface side is a first opening 381, and the opening 38 provided at the end portion on the front surface side is a second opening 382.

The first screw 33 is provided in one region of the space in the housing 31 partitioned by the partition wall 35, and the second screw 34 is provided in the other region. The first screw 33 and the second screw 34 are disposed to face each other with the axes thereof in parallel with each other. A development gear 36 is connected to each of a shaft of the first screw 33 and a shaft of the second screw 34, and the first screw 33 and the second screw 34 are rotated by a rotational force from a driving source (not illustrated) transmitted via the development gear 36.

The housing 31 includes a reception port 37 that receives the toner conveyed from the conveyor 80 at an end portion on the front surface side. The toner received from the reception port 37 is conveyed to the back surface side by the second screw 34. The toner conveyed to the end portion on the back surface side by the second screw 34 is fed to the region where the first screw 33 is disposed via the first opening 381. The toner fed to the region where the first screw 33 is disposed through the first opening 381 is conveyed to the front surface side by the first screw 33. The toner conveyed to the end portion on the front surface side by the first screw 33 is fed to the region where the second screw 34 is disposed via the second opening 382. In this way, the developer accommodated in the space partitioned by the partition wall 35 having the openings 38 at both ends is circulated by rotating the first screw 33 and the second screw 34.

The development roller 32 is provided so as to face the photoreceptor drum 2, and a part of the developer conveyed by the first screw 33 is supplied to the development roller 32 and carried on the surface of the development roller 32. Then, only the toner from the developer carried on the surface is supplied to the photoreceptor drum 2. In the present embodiment, the development roller 32 is disposed above the first screw 33. However, the disclosure is not limited thereto, and the development roller 32 may be provided so as to face a portion of the development unit 3 that supplies the developer to the outside. The reception port 37 provided at the end portion of the housing 31 is connected to the discharge port 82 of the corresponding conveyor 80. In the development unit 3, a toner sensor 39 (see FIGS. 6 and 8) that detects the amount of toner stored in the development device 3 is attached to the housing 31 to detect the amount of toner in the housing 31. In the present embodiment, a magnetic permeability sensor that detects the toner amount from the magnetic permeability of the carrier is used as the toner sensor 39.

Figure 7:
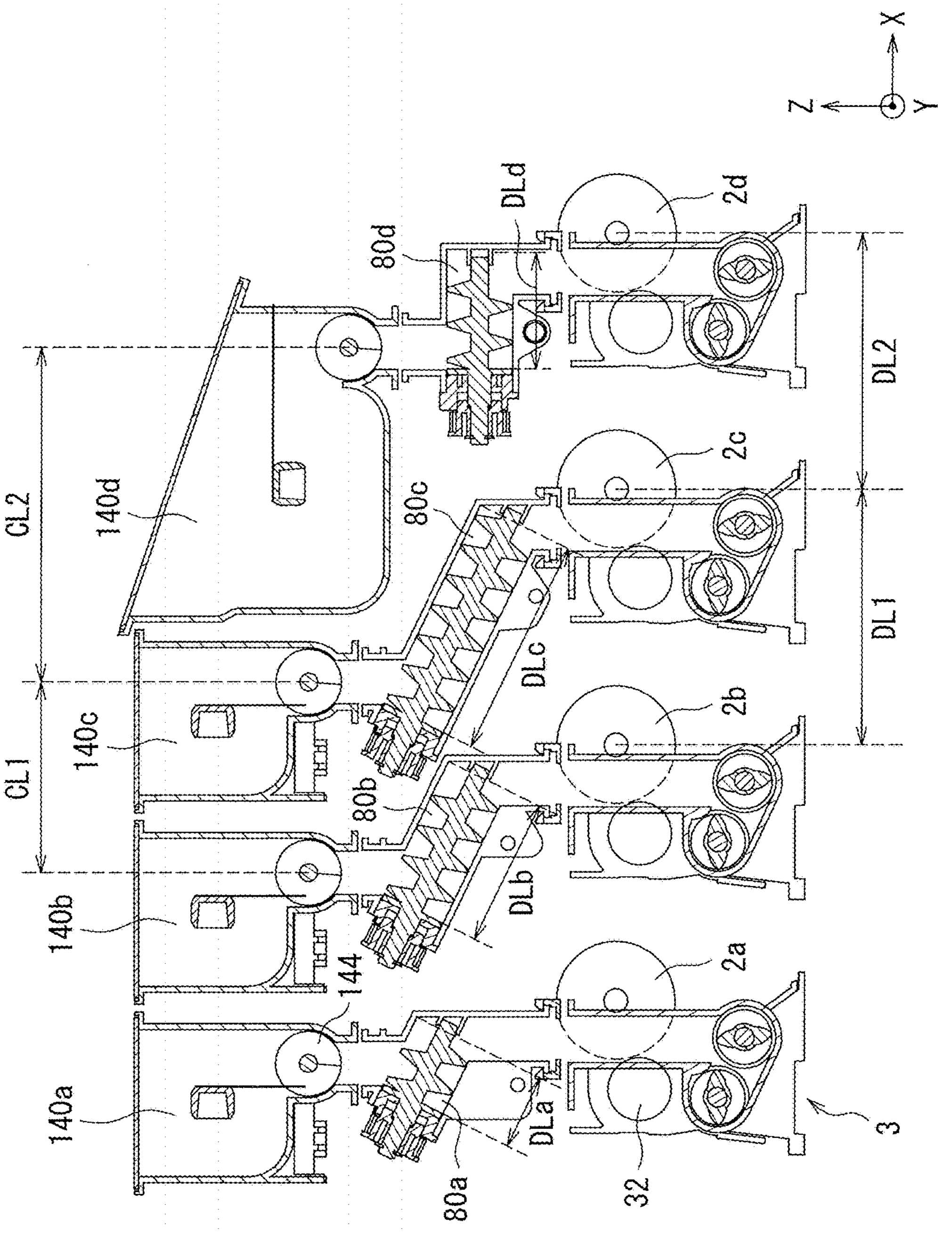
FIG. 7 is a schematic cross-sectional view illustrating the positional relationship among the cartridges, the conveyors, and photoreceptor drums.

FIG. 7 is a schematic cross-sectional view illustrating the positional relationship among the cartridges, the conveyors, and the photoreceptor drums.

In FIG. 7, the four cartridges 140 and the conveyor 80, the photoreceptor drum 2, and the development unit 3 corresponding to each of the four cartridges 140 are extracted and illustrated. In the present embodiment, the four photoreceptor drums 2 are arranged at substantially constant intervals. For example, the interval between the third photoreceptor drum 2*c* and the fourth photoreceptor drum 2*d* (second drum distance DL2) is substantially equal to the interval between the second photoreceptor drum 2*b* and the third photoreceptor drum 2*c* (first drum distance DL1). In the present embodiment, the first drum distance DL1 and the second drum distance DL2 are the same 65 mm.

As described above, since the cartridges 140 having different sizes are mixed, there is a difference in the interval between the cartridges 140. To be specific, the interval between the third cartridge 140*c* and the fourth cartridge 140*d* (second cartridge distance CL2) is greater than the interval between the second cartridge 140*b* and the third cartridge 140*c* (first cartridge distance CL1). The first cartridge distance CL1 is less than the first drum distance DL1 and the second drum distance DL2, whereas the second cartridge distance CL2 is greater than the first drum distance DL1 and the second drum distance DL2.

To be more specific, the first cartridge distance CL1 in the present embodiment is 48.5 mm, and the second cartridge distance CL2 is 85 mm. Since the first drum distance DL1 and the second drum distance DL2 are 65 mm, the first cartridge distance CL1 is shorter than the first drum distance DL1 and the second drum distance DL2, and the second cartridge distance CL2 is longer than the first drum distance DL1 and the second drum distance DL2.

In this way, the plurality of cartridges 140 are configured such that the interval between some of the cartridges is greater and the interval between the others is less than the interval between the photoreceptor drums 2. This is implemented by adjusting the length of each conveying path 83 in the plurality of conveyors 80 (first conveyor 80*a* to fourth conveyor 80*d*). That is, by changing the length of the conveying path 83 of each cartridge 140, it is possible to mix a plurality of cartridges 140, that is, the cartridges 140, the interval between which is greater than the interval between the photoreceptor drums 2, and the cartridges 140, the interval between which is less than the interval between the photoreceptor drums 2, and it is possible to make the sizes of the cartridges 140 different.

In the image forming device 100, the amount of toner in the development unit 3 is controlled to be kept constant, and when the toner is consumed by image formation and the toner amount detected by the toner sensor 39 becomes smaller than a predetermined value, the toner supply motor 150 is driven to supply the toner from the cartridge 140 to the development unit 3. At the time of shipment, the cartridge 140 is in a state of being removed, and is mounted before use. At this time, the conveyor 80 is not filled with toner, and toner is not immediately supplied to the development unit 3 even if the toner supply motor 150 is driven. Thus, in the present embodiment, when the mounting of the cartridge 140 is detected, a filling operation to fill the conveyor 80 with toner is performed.

Figure 8:
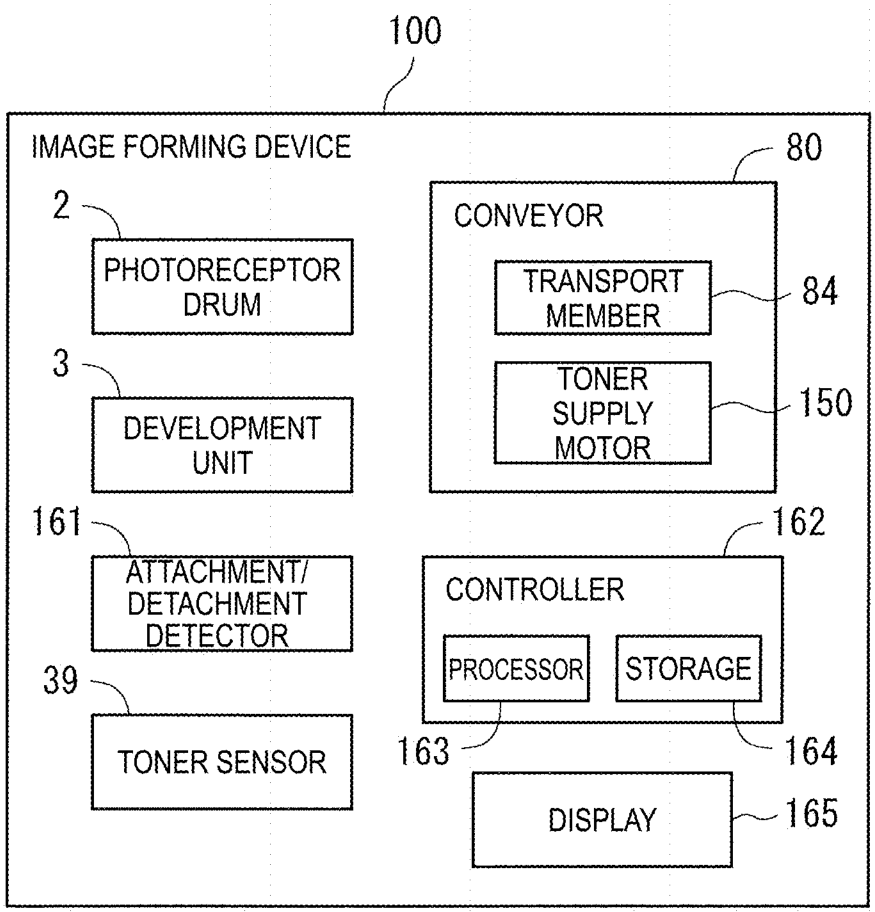
FIG. 8 is a diagram illustrating a schematic configuration of the image forming device according to the present embodiment.

FIG. 8 is a diagram illustrating a schematic configuration of the image forming device according to the present embodiment. In FIG. 8, a part of the image forming device 100 is extracted and illustrated, and the image forming device 100 may include other members not illustrated in FIG. 8 as appropriate.

The image forming device 100 includes a controller 162 and a display 165 in addition to the photoreceptor drum 2, the development unit 3, the toner sensor 39, the attachment/detachment detector 161, and the conveyor 80 described above. The controller 162 includes a processor 163 and a storage 164. The processor 162 is a microcomputer such as a central processing unit (CPU) mounted on the image forming device 100. The storage 164 includes a nonvolatile memory such as a read only memory (ROM) and a volatile memory such as a random access memory (RAM) mounted on the image forming device 100. The processor 163 loads a control program stored in advance in the ROM of the storage 164 onto the RAM of the storage 164 and executes the control program, so that the controller 162 controls operation of the image forming device 100, executing a filling operation to be described later, for example. The nonvolatile memory of the storage 164 stores a filling determination variable to be described later. The display 165 is a touch panel, a liquid crystal display, or the like that causes the image forming device 100 to perform a predetermined operation, and displays operation contents and contents of an error that has occurred.

Figure 9:
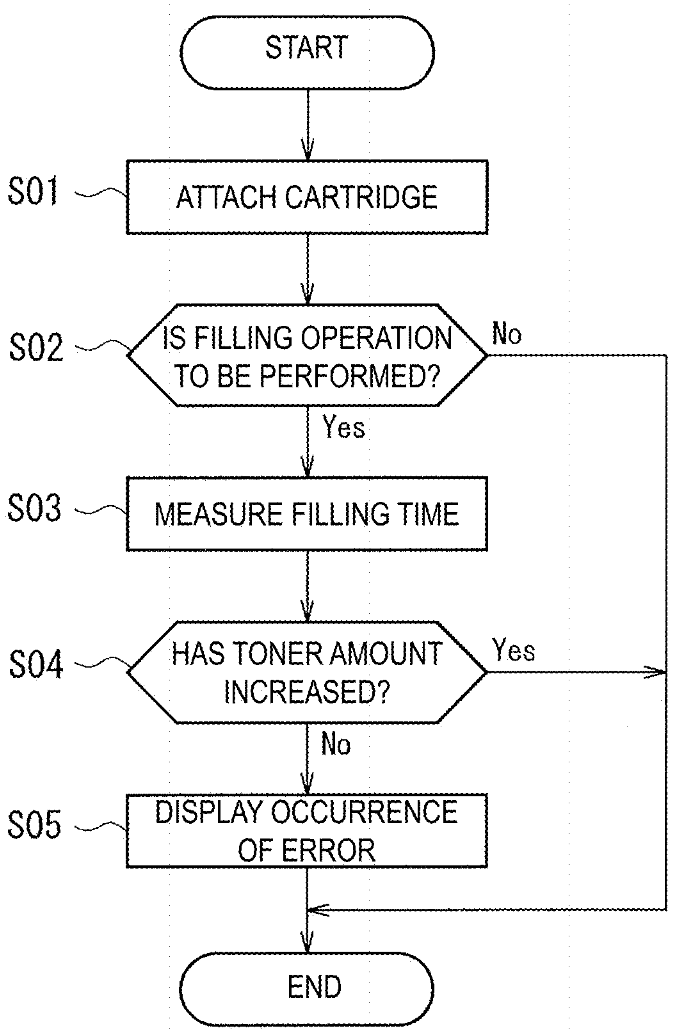
FIG. 9 is a flowchart illustrating a process flow related to a filling operation by the image forming device according to the present embodiment.

FIG. 9 is a flowchart illustrating a process flow related to the filling operation by the image forming device according to the present embodiment.

In the process flow illustrated in FIG. 9, the process is started when the cartridge 140 is attached to the image forming device 100.

In step S01, the attachment/detachment detector 161 detects that the cartridge 140 is attached. Here, the controller 162 reads out the filling determination variable stored in the storage 164 and checks the value thereof. The filling determination variable stored in the storage 164 is a variable that is used to determine whether the conveying path 83 is filled with toner, and a value of "0" is stored as an initial value at the time of shipment. Since the conveying path 83 is not filled with toner at the time of factory shipment as described above, the initial value "0" means a state where the conveying path 83 is not filled with toner. Since it is sufficient that the filling determination variable can determine a state in which the conveying path 83 is not filled with toner, the value stored in the filling determination variable may be a specific symbol, for example, a word such as "empty".

In addition, (the value of) the filling determination variable is set to the initial value or a value different from the initial value, and after the filling operation is performed, the value is changed to the value different from the initial value, for example, "1", and the changed value is stored in the storage 164. This is merely an example, and after the filling operation is performed, the value may be changed to a specific symbol or word such as "full". In this way, it is possible to determine whether the conveying path 83 is filled with toner according to the value stored in the filling determination variable. That is, it is possible to determine whether there is toner in the conveying path 83, even without providing a sensor that detects the presence of toner in the conveying path 83.

In step S02, the controller 162 determines whether the filling operation is to be performed based on the value of the filling determination variable read from the storage 164. Here, when the filling determination variable is the initial value, the controller 162 causes the filling operation to be performed, and when the filling determination variable is other than the initial value, the controller 162 does not cause the filling operation to be performed. As a result, when it is determined that the filling operation is to be performed (step S02: Yes), the process proceeds to step S03. On the other hand, when it is determined that the filling operation is not to be performed (step S02: No), the process is ended. In other words, when the attachment/detachment detector 161 detects the attachment of the cartridge 140, the controller 162 proceeds to step S03 if the value of the filling determination variable stored in the storage 164 is the initial value, and, ends the process without executing the filling operation if the value of the filling determination variable is a value other than the initial value.

In step S03, the controller 162 operates the conveyor 80 to measure the filling time. Here, the filling time corresponds to the amount of operation of the conveyor 80, and may be simply the time during which the transport screw 84 is rotated or may be the number of rotations made by the transport screw 84. The transport screw 84 is controlled so as to rotate at a constant speed, and the number of rotations is determined according to the time during which the transport screw 84 is rotated.

In step S04, the controller 162 checks the detection value of the toner sensor 39 and determines whether the amount of toner in the housing 31 has increased. When the toner amount is detected by the toner sensor 39, it is preferable that the development unit 3 is operating. Therefore, the development unit 3 may start the rotation operation of the first screw 33, the second screw 34, and the development roller 32 in synchronization with the start of the conveying operation by the conveyor 80, or may start the operation before the conveyor 80.

Then, when the toner sensor 39 detects an increase in the toner amount (step S04: Yes), the value of the filling determination variable is changed to a value different from the initial value and stored in the storage 164 as described above, and the process is ended. In other words, when the toner sensor 39 detects an increase in the toner amount during the filling operation, the controller 162 stops the conveyance of toner by the conveyor 80, changes the value of the filling determination variable to a value different from the initial value, and stores the changed value in the storage 164.

On the other hand, when the toner sensor 39 does not detect an increase in the toner amount even if the filling time, which is the operation time of the conveyor 80, exceeds a prescribed time (for example, two minutes), which is a predetermined time (step S04: No), the filling operation is stopped, and the process proceeds to step S05.

In step S05, the controller 162 displays an error occurrence message on the display 165, and ends the process. Here, an error message indicating that no toner has been supplied by mounting the cartridge 140 is displayed on the display 165. That is, when the toner sensor 39 does not detect an increase in the toner amount even if the filling time of the conveyor 80 exceeds a prescribed time, which is a predetermined time, during the execution of the filling operation, the controller 162 stops the filling operation and displays the occurrence of an error on the display 165. The display 165 may be a speaker, a lamp, or the like as long as the display 165 can notify the user that an error has occurred. In this case, it is possible to notify the user that an error has occurred by sound, light, or the like.

As described above, in the image forming device 100, it is determined whether to perform the filling operation based on (the value of) the filling determination variable stored in advance. Therefore, it is possible to determine the necessity of the filling operation by referencing the filling determination variable when the cartridge 140 is attached to the main body, even without providing a sensor that detects the presence or absence of the toner for the conveyor 80. Further, by setting the filling determination variable as appropriate, it is possible to easily switch between a state in which the filling operation is necessary and a state in which the filling operation is not necessary. Therefore, it is possible to easily determine whether the filling operation is necessary by also taking a measure to improve the contact state between the connection terminal 142 and the engagement terminal by attaching or detaching the cartridge 140 in a case where communication with the memory in the connection terminal 142 of the cartridge 140 becomes impossible.

When the toner sensor 39 detects an increase in the toner amount during the filling operation, that is, when Yes is determined in step S04, the controller 162 stops the conveyance of the toner by the conveyor 80 and changes the filling determination variable to a value different from the initial value. In this way, since the filling operation is terminated after an increase in the toner amount is detected, it is possible to reliably achieve a state in which toner can be replenished.

In step S03, the controller 162 may increase the filling determination variable as the conveyor 80 is operated during the filling operation. Here, the filling time may be applied as the filling determination variable. In this way, the filling determination variable can be set in accordance with the amount of operation of the conveyor 80, and the operation amount necessary for the filling operation can be grasped.

Regarding step S04, the determination may be made after a prescribed time, which is a predetermined time, has elapsed from the start of the filling operation. That is, when the toner sensor 39 does not detect an increase in the toner amount even if the filling time, which is the operation time of the conveyor 80, exceeds the prescribed time in the filling operation, the controller 162 stops the filling operation and makes a notification of an error. In this way, when an increase in the toner amount is not detected even if the filling operation is performed, it can be predicted that some kind of malfunction has occurred, and thus it is possible to stop the operation at an appropriate timing.

The prescribed time may be set according to the length of the conveying path 83 of the corresponding conveyor 80. That is, a short prescribed time is set for the first conveyor 80*a* having a short conveying path 83, and a long prescribed time is set for the third conveyor 80*c* having a long conveying path 83. It is not necessary to set the prescribed time in accordance with the amount of operation for reaching the discharge port 82 from the introduction port 81, and the prescribed time may be set in accordance with the amount of operation with a slight margin. Hereinafter, for the sake of description, the prescribed time prescribed according to the length of the conveying path 83 may be referred to as an "individual prescribed time".

In the image forming device 100, the amount of toner in the development unit 3 is detected not only when the cartridge 140 is mounted but also when image formation is performed, and toner is replenished as appropriate. During the execution of the image forming operation, even when the toner amount detected by the toner sensor 39 becomes less than a predetermined value (for example, a toner amount with which the weight ratio of the toner to the carrier remaining in the development device 3 and not consumed is 7%), the controller 162 causes the conveyor 80 to convey the toner and supplies the toner consumed by the image formation to the development device 3 as appropriate. During the replenishment operation, if the toner sensor 39 does not detect an increase in the toner amount even when the time obtained by adding a predetermined time, which is the time required to discharge the toner in the cartridge 140, to the individual prescribed time which is prescribed according to the length of the conveying path 83 expires, it is determined that the cartridge 140 is empty of toner. Then, the filling determination variable is changed to the initial value and stored in the storage 164, and a message prompting the replacement of the cartridge 140 with a new one is displayed on the display 165.

That is, even when the amount of toner in the development device 3 becomes small during the image forming operation, the processes from step S03 to step S05 are performed. In this way, by returning the filling determination variable to the initial value when the cartridge 140 becomes empty, it is possible to determine that the filling operation is necessary for the relevant conveyor 80.

Note that the embodiments disclosed herein are illustrative in all respects and are not the basis for a limited interpretation. Accordingly, the technical scope of the disclosure is not to be construed by the foregoing embodiments only and is defined based on the description of the claims. In addition, meanings equivalent to the range of the claims and all changes made within the range are included.

REFERENCE SIGNS LIST

2 Photoreceptor drum (example of image carrier)
3 Development unit
39 Toner sensor
80 Conveyor
100 Image forming device
150 Toner supply motor
161 Attachment/detachment detector
162 Controller

The invention claimed is:

1. An image forming device that forms an image using toner contained in an attachable cartridge, the image forming device comprising:

a development unit that forms a toner image on an image carrier;

a conveyor that receives the toner from the cartridge and conveys the toner to the development unit;

a toner sensor that detects an amount of the toner stored in the development unit;

an attachment/detachment detector that detects attachment and detachment of the cartridge; and a controller including a storage, the controller determining, in a case that the attachment/detachment detector detects the attachment of the cartridge, whether to perform a filling operation to fill the conveyor with the toner, based on a filling determination variable stored in the storage, wherein:

the filling determination variable is settable to an initial value or a value different from the initial value, and in a case that the filling operation is not performed, the filling determination variable is set to the initial value.

2. The image forming device according to claim 1, wherein in a case that the attachment/detachment detector detects the attachment of the cartridge, the controller;

performs the filling operation when a value of the filling determination variable stored in the storage is the initial value, and forgoes performing the filling operation either when the value of the filling determination variable is a value other than the initial value or when the toner sensor detects a toner amount that meets a predetermined value.

3. The image forming device according to claim 2, wherein in a case that the toner sensor detects an increase in the toner amount while the filling operation is performed, the controller causes the conveyor to stop conveying the toner, changes the value of the filling determination variable to a value different from the initial value, and stores the changed value in the storage.

4. The image forming device according to claim 3, further comprising:

a display, wherein in a case that the toner sensor does not detect an increase in the toner amount and an operation time of the conveyor exceeds a predetermined time during execution of the filling operation, the controller stops the filling operation and displays an occurrence of an error on the display.

5. The image forming device according to claim 2, wherein the controller:

causes the conveyor to convey the toner in a case that the value of the filling determination variable stored in the storage is a value other than the initial value and the toner sensor detects a toner amount that is less than the predetermined value, and determines that the cartridge is empty of the toner and sets the filling determination variable to the initial value in a case that the toner amount detected by the toner sensor does not increase.

6. The image forming device according to claim 1, wherein a plurality of cartridges are attachable to and detachable from the image forming device, and the image forming device includes a plurality of conveyors and a plurality of development units corresponding to the respective plurality of cartridges, and a length of a conveying path of each of the plurality of conveyors from the cartridge to the development unit is different.

7. The image forming device according to claim 6, further comprising:

a second conveyor; and a display, wherein in a case that the toner sensor does not detect an increase in the toner amount for the second conveyor, even when an individual prescribed time, determined in accordance with the length of the conveying path, is exceeded during execution of the filling operation, the controller causes the second conveyor to stop the filling operation, and displays an occurrence of an error on the display.

8. The image forming device according to claim 7, wherein:

the plurality of cartridges is disposed such that cartridges of the plurality of cartridges are adjacent to each other, an interval between a first pair of the cartridges of the plurality of cartridges is greater than an interval between the image carrier and another image carrier in a plurality of image carriers, and an interval between a second pair of the cartridges is less than the interval between the image carrier and the other image carrier.

* * * * *